United States Patent

Hempel et al.

[11] 3,878,242
[45] Apr. 15, 1975

[54] PROCESS FOR THE PRODUCTION OF TRIHALOGENOMETHYL BENZENE SULPHONIC ACID HALIDES

[75] Inventors: Jan Hempel, Leverkusen; Erich Klauke, Odenthal-Hahnenberg, both of Germany

[73] Assignee: Bayer Aktiengesellschaft, Leverkusen, Germany

[22] Filed: Oct. 20, 1970

[21] Appl. No.: 82,507

[30] Foreign Application Priority Data
Oct. 29, 1969 Germany............................ 1954448

[52] U.S. Cl............................ 260/543 R; 260/543 F
[51] Int. Cl............................................. C07c 143/40
[58] Field of Search...................... 260/543 R, 543 F

[56] References Cited
UNITED STATES PATENTS
| | | | |
|---|---|---|---|
| 3,034,955 | 5/1962 | Frick et al................ | 260/556 AR X |
| 3,095,446 | 6/1963 | Margerison et al............ | 260/543 R |
| 3,322,828 | 5/1967 | Muth et al................. | 260/543 R X |

FOREIGN PATENTS OR APPLICATIONS
141,151   2/1961   U.S.S.R........................... 260/543 R

OTHER PUBLICATIONS
Nolley, Chem. Org. Compds. (1963), pg. 508.

*Primary Examiner*—Lorraine A. Weinberger
*Assistant Examiner*—Richard D. Kelly
*Attorney, Agent, or Firm*—Burgess, Dinklage & Sprung

[57] ABSTRACT

Trihalogenomethyl benzene sulphonic acid halides are obtained by reacting a X, Y benzene corresponding to the general formula:

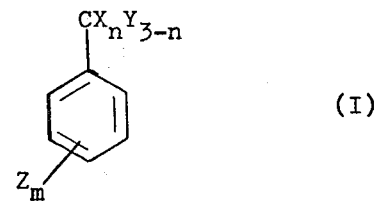

in which
X,Y and Z, which may be the same or different, each represents a halogen atom,
$n$ represents 0 or an integer from 1 to 3, and
$m$ represents 0 or an integer from 1 to 4, with a halogenosulphonic acid corresponding to the formula:

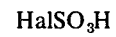

in which
Hal represents a halogen atom,
at a temperature of from −50° to +80°C in the presence of at least the stoichiometrically necessary quantity of sulphur trioxide.

The novel compounds obtainable by this process are intermediates for the production of plant protection agents and pharmaceuticals.

2 Claims, No Drawings

PROCESS FOR THE PRODUCTION OF TRIHALOGENOMETHYL BENZENE SULPHONIC ACID HALIDES

This invention relates to a novel process for the synthesis of trihalogenomethyl benzene sulphonic acid halides, and to new compounds in this class.

It has now been found that trihalogenomethyl benzene sulphonic acid halides can be obtained by reacting a trihalogenomethyl benzene corresponding to the general formula:

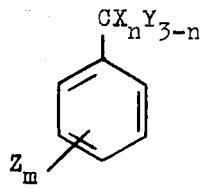
(I)

in which
X, Y and Z, which may be the same or different, each represents a halogen atom,
$n$ represents 0 or an integer from 1 to 3, and
$m$ represents 0 or an integer from 1 to 4,
with a halogenosulphonic acid corresponding to the formula:

Hal SO$_3$H   (II)

in which
Hal represents a halogen atom,
at a temperature of from −50° to +80°C in the presence of at least the stoichiometrically necessary quantity of sulphur trioxide.

The reaction is preferably carried out at a temperature of from −20° to +20°C.

Halogen atoms (X, Y, Z) are fluorine, chlorine and bromine atoms, X preferable representing fluorine, X chlorine and Z chlorine. Fluorine and chlorine are preferred halogen atoms Hal. Preferred starting compounds are those in which $n$ represents 2 or 3 and $m$ represents 0, 1 or 2.

The sulphur trioxide required for the reaction may either be employed as such or in the form of a compound which yields sulphur trioxide, preferably in the form of a solution of sulphur trioxide in sulphuric acid (20 to 65 percent by weight oleum), 65 percent by weight oleum being preferred.

The compounds obtainable by the process according to the invention correspond to the general formula:

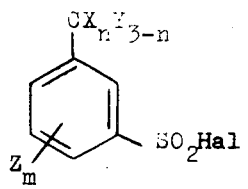
(III)

in which the substituents Hal, X, Y and Z have the meanings given above.

It is already known (see German Patent Specification No. 671,903; and LM. Jagupolski, V.J. Troitskaja, *J. Gen. Chem. USSR* (Engl.) 1959, 549) that trifluoromethylbenzene sulphonic acids can be obtained by the action of sulphur trioxide on trifluoromethylbenzene. Unfortunately, the reaction takes at least 20 hours to complete, and working up is as time-consuming as it is complicated owing to the need to salt out the product and dry the resulting sulphonic acid salts. Before the sulphonic acid salts can be further processed, for example into sulphonamides or by reduction of the sulpho group, another reaction stage is required for conversion into the sulphochloride. Accordingly, a direct reaction of benzotrifluorides with chlorosulphonic acid into the sulphochlorides would be regarded as an appropriate and rational means of synthesising fluorine-containing sulphochlorides of this kind.

Unfortunately, the reaction of, for example, concentrated sulphuric acid, or chlorosulphonic acid, or mixtures of both, with trifluoromethylbenzene is not accompanied by sulphonation. Instead, the trifluoromethyl radical is attacked, so that carboxylic acids of sulphocarboxylic acids are obtained as reaction products (see German Patent Specification No. 671,903).

According to the prior art, the direct sulphochlorination of halogenomethyl benzenes of formula (I) into halogenomethylbenzenes, compounds of formula (III), should not have been successful.

Surprisingly, it has now been found that halogenomethyl benzene sulphohalides of formula (III) can be obtained in high yields from halogenomethylbenzenes of formula (I) by reaction with halogen sulphonic acids of formula (II) under the conditions described above.

When o-chlorobenzotrifluoride and chlorosulphonic acid are used as starting materials, the reaction takes place in accordance with the following scheme:

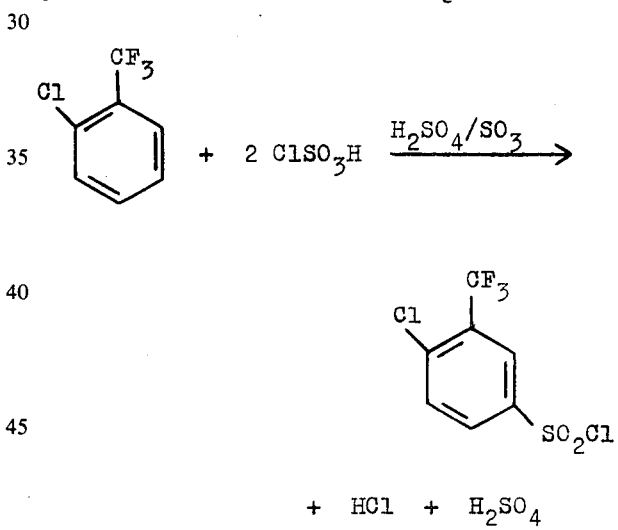

The halogenomethyl benzenes of formula (I), preferably used as starting materials, are known and can be obtained in known manner by reacting trichloromethyl benzenes with anhydrous hydrofluoric acid.

The following compounds are examples of the starting materials which may be used in accordance with the invention: trifluoromethyl benzene, difluorochloromethyl benzene, 1-chloro-2-trifluoromethyl benzene, 1-chloro-4-trifluoromethyl benzene, 1,3-dichloro-4-trifluoromethyl benzene and 1,3-dichloro-2-trifluoromethyl benzene.

Fluorosulphonic acid and chlorosulphonic acid are examples of halogen sulphonic acids of formula (II).

The process according to the invention may be carried out either in the absence or in the presence of an inert organic solvent. Suitable solvents include any of the solvents normally used for chlorosulphonation reactions, for example chloroform, carbon tetrachloride or hexachloroethane.

2 Mols of halogen sulphonic acid of the formula (II) are preferably used per mol of starting compound of formula (I). The sulphur trioxide is added in a quantity of at least 1 mol, based on the starting compound of formula (I).

The reaction is carried out at a temperature in the aforementioned range by adding the starting compound of formula (I) dropwise to the cooled sulphonating agent of formula (II), to which the right amount of sulphur trioxide has been added. The reagents may, however, also be added in the reverse order. On completion of the addition, the reaction time at a temperature in the aforementioned range is generally from about 2 to about 15 hours and preferably from about 2 to 8 hours.

The compounds of formula (III) prepared in accordance with the invention usually accumulate in the form of colourless oils, some of which crystallise on standing. On completion of the reaction, they are poured on to ice in known manner in order to dilute excess acid, and then isolated in the usual way and optionally purified.

Some of the products obtained by the process according to the invention are new and may be used in the production of plant protection agents and dyes. The compounds of general formula (III) are new when Hal represents fluorine and when Hal represents chlorine providing $m$ represents 2, 3 or 4 and $n$ represents 0, 1, 2 or 3 or $m$ represents 0 and $n$ represents 1 or 2.

The new compounds can be obtained from the compounds prepared in accordance with the invention (Hal represents chlorine) by methods known per se, by replacing chlorine with fluorine by means of anhydrous hydrofluoric acid, or metal fluorides in organic or aqueous solution.

The novel compounds obtainable by the process according to the invention are valuable intermediates for the production of plant protection agents of the kind described in the following Patent Specifications: French Patent Specification No. 1,224,090; Swiss Patent Specifications No. 364,248 and 369,439; and Belgian Patent Specifications No. 581,914 and 591,655. Furthermore the new compounds can be used for the preparation of pharmaceuticals (See Swiss Pat. No. 377,801 and German Pat. No. 1,212,544).

The temperature quoted in the following Examples are in °C.

EXAMPLE 1

274 g of 1-chloro-2-trifluoromethyl benzene are added dropwise at −5° to 0°C to a mixture of 300 ml of chlorosulphonic acid and 150 ml of 65% by weight oelum. The reaction mixture is stirred for 4 hours at 0°C, and poured on to ice, and the oil precipitated is isolted. After distillation (b.p. 128°–131°C/12 Torr, $n_D^{20}$ 1.5158), the yield comprises 300 g of 4-chloro-5-trifluoromethyl benzene sulphonic acid chloride (70% of the theoretical, based on the 1-chloro-2-trifluoromethyl benzene used).

EXAMPLE 2

350 g of benzotrifluoride are added dropwise at 5°C to a mixture of 500 ml of chlorosulphonic acid and 175 ml of 65% by weight oleum. After stirring for 4 hours, the reaction mixture is worked up as described in Example 1. 3-Trifluoromethyl benzene sulphonic acid chloride (b.p. 103°–108°C/12 Torr, $n_D^{20}$ 1.4860) is isolated in a yield of 450 g (77% of theoretical).

EXAMPLE 3

140 g of benzotrifluoride are added dropwise at 20°C to 600 g of fluorosulphonic acid and 120 g of 65% by weight oleum (glass apparatus). The resulting mixture is stirred for 9 hours at 20°C, is then poured on to ice in a polyethylene vessel, and the oil precipitated is isolated. Distillation gives 188 g of 3-trifluoromethyl benzene sulphonic acid fluoride (b.p. 79°–81°C/12 Torr, $n_D^{20}$ 1.4400).

EXAMPLE 4

107 g of 1,3-dichloro-4-trifluoromethyl benzene are stirred at 25°C with 82 ml of chlorosulphonic acid and 35 ml of 65% by weight oleum. 94 g of 2,4-dichloro-5-trifluoromethyl benzene sulphonic acid chloride are isolated (b.p. 142°–144°C/12 Torr). The oil gradually hardens to form a solid melting at 40.5° to 42°C.

EXAMPLE 5

380 g of chlorodifluoromethyl benzene are added dropwise at −10°C to 350 ml of chlorosulphonic acid and 150 ml of 65% by weight oleum. After a reaction time of 4 hours at 0°C, the reaction product is worked up as in Example 1. 3-Chlorodifluoromethyl benzene sulphonic acid chloride (b.p. 144°–148°C/15 Torr, $n_D^{20}$ 1.5190) is obtained in a yield of 195 g.

Preparation of the novel sulphonic acid fluorides by chlorine/fluorine exchange from the chlorides obtainable by the process according to the invention is illustrated in the following:

A mixture of 279 g of 4-chloro-5-trifluoromethyl benzene sulphonic acid chloride is heated under reflux for 3 hours with 100 g of potassium fluoride and 150 ml of water. The sulphofluoride formed is isolated in the usual way. 4-Chloro-5-trifluoromethyl benzene sulphonic acid fluoride is obtained in a yield of 201 g (b.p. 114°–118°C/19 Torr, $n_D^{20}$ 1.4762).

We claim:
1. Process for preparing trihalogenmethyl benzene sulfonic acid halides which comprises reacting a trihalogenomethyl benzene selected from the group of trifluoromethyl benzene, difluorochloromethyl benzene, 1-chloro-2-trifluoromethyl benzene, 1-chloro-4-trifluoromethyl benzene, 1,3-dichloro-4-trifluoromethyl benzene and 1,3-dichloro-2-trifluoromethyl benzene with a halogenosulfonic acid having the formula

Hal SO$_3$H where Hal is a halogen atom, at a temperature of from −50° to 80°C in the presence of at least the stoichiometrically necessary quantity of sulfur trioxide in the form of 20 to 65 percent by weight oleum.

2. A process as claimed in claim 1 wherein reaction is carried out in an inert organic solvent.

* * * * *